(12) United States Patent
Michikoshi et al.

(10) Patent No.: US 10,527,150 B2
(45) Date of Patent: Jan. 7, 2020

(54) CONTROL DEVICE OF VEHICLE

(71) Applicant: TOYOTA JIDOSHA KABUSHIKI KAISHA, Toyota-shi, Aichi (JP)

(72) Inventors: Yosuke Michikoshi, Toyota (JP); Satoshi Ito, Toyota (JP); Shintaro Goto, Nagoya (JP); Masashi Ikemura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/115,937

(22) Filed: Aug. 29, 2018

(65) Prior Publication Data
US 2019/0072173 A1 Mar. 7, 2019

(30) Foreign Application Priority Data

Sep. 5, 2017 (JP) .................. 2017-170676

(51) Int. Cl.
| | |
|---|---|
| *F16H 61/00* | (2006.01) |
| *F16H 57/00* | (2012.01) |
| *F16H 57/04* | (2010.01) |
| *F16H 61/14* | (2006.01) |
| *F16H 59/14* | (2006.01) |
| *F16H 59/36* | (2006.01) |
| *F16H 61/02* | (2006.01) |

(52) U.S. Cl.
CPC ..... *F16H 57/0006* (2013.01); *F16H 57/0435* (2013.01); *F16H 57/0446* (2013.01); *F16H 57/0473* (2013.01); *F16H 57/0484* (2013.01); *F16H 59/14* (2013.01); *F16H 59/36* (2013.01); *F16H 61/0021* (2013.01); *F16H 61/14* (2013.01); *F16H 61/0262* (2013.01); *F16H 2059/147* (2013.01); *F16H 2059/366* (2013.01); *F16H 2200/006* (2013.01); *F16H 2200/2046* (2013.01); *F16H 2716/08* (2013.01)

(58) Field of Classification Search
CPC ............ F16H 57/0006; F16H 57/0435; F16H 57/0473; F16H 57/0446; F16H 2057/0012; F16H 61/0021; F16H 61/14; F16H 2061/0037; F16H 2059/366
See application file for complete search history.

(56) References Cited

U.S. PATENT DOCUMENTS

| | | | |
|---|---|---|---|
| 9,477,231 B2 * | 10/2016 | Miyata | .................. F04B 49/02 |
| 2010/0304914 A1 * | 12/2010 | Barrett | .................. F16H 48/08 |
| | | | 475/160 |

FOREIGN PATENT DOCUMENTS

JP 2016-211686 A 12/2016

* cited by examiner

*Primary Examiner* — Erin D Bishop
(74) *Attorney, Agent, or Firm* — Oliff PLC

(57) ABSTRACT

A control device of a vehicle has a drive source, a power transmission device having a plurality of rotating elements coupled via a gear and a plurality of friction engagement elements selectively coupling the plurality of rotating elements for transmitting an output of the drive source, and a lubricating device supplying a lubrication oil to the friction engagement elements for lubrication, the control device comprising: a lubrication control portion configured to increase an amount of the lubrication oil to the friction engagement elements from the lubricating device in a booming sound generating region predefined with respect to a drive source rotation speed.

9 Claims, 8 Drawing Sheets

FIG.4

|  | C1 | C2 | C3 | C4 | B1 | B2 |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev |  |  | ○ |  |  | ○ |

○:ENGAGEMENT    BLANK:RELEASE

CONTROL DEVICE OF VEHICLE

This application claims priority from Japanese Patent Application No. 2017-170676 filed on Sep. 5, 2017, the disclosure of which is herein incorporated by reference in its entirety.

BACKGROUND OF THE INVENTION

1. Field of the Invention

The present invention relates to a technique to suppress occurrence of booming sound of a vehicle comprising a power transmission device including multiple friction engagement elements selectively coupling multiple rotating elements for transmitting an output of a drive source.

2. Description of the Related Art

A vehicle is widely known that includes (a) a drive source and (b) a power transmission device including multiple rotating elements coupled via a gear and multiple friction engagement elements selectively coupling the multiple rotating elements for transmitting an output of the drive source. A vehicle described in Patent Document 1 is an example thereof and includes an engine as the drive source while a multi-speed transmission is used as the power transmission device. Such a vehicle generally includes a lubricating device supplying a lubrication oil to the friction engagement elements for lubrication.

PRIOR ART DOCUMENT

Patent Document

Patent Document 1: Japanese Laid-Open Patent Publication No. 2016-211686

However, in such a vehicle, a rotational vibration (e.g., explosion vibration of the engine, torque pulsation of an electric motor) of the drive source is transmitted to a power transmission system such as a power transmission device, and a booming sound may occur in the vehicle interior and deteriorate NV [Noise, Vibration] performance. For example, the power transmission device includes a loaded rotating element involved in power transmission and an unloaded rotating element not involved in power transmission depending on a power transmission state, i.e., an engagement/release state of the friction engagement elements. Although this unloaded rotating element is originally only rotated in a dragged manner and has almost no load, the element repeatedly collides with a gear of the loaded rotating element involved in power transmission in a region with large rotational vibration of the drive source and is thereby rotated in a dragged manner while the inertia of the unloaded rotating element is applied to the loaded rotating element, and the rotational vibration of the drive source is damped so that the occurrence of the booming sound is suppressed. However, when rotation speed of the drive source increases and the rotational vibration decreases, the collision of the unloaded rotating element with the gear of the loaded rotating element is reduced or eliminated so that the inertia derived from the unloaded rotating element disappears (inertia loss), which makes it difficult to damp the rotational vibration of the drive source, and the rotational vibration is transmitted to the power transmission system such as a power transmission device, leading to deterioration of the booming sound. The inertia (mass) of the loaded rotating element tends to decrease since multi-speed transmissions are recently made to be more compact and to have larger number of speeds, resulting in a noticeable deterioration of the booming sound due to inertia loss of the unloaded rotating element. Additionally, the deterioration of the booming sound may become a problem in a predetermined drive source rotation speed region due to resonance. It is conceivable that, for example, a lock-up clutch is released for preventing occurrence of such booming sound; however, this leads to narrowing a condition for engaging the lock-up clutch, which deteriorates a fuel consumption of the vehicle.

SUMMARY OF THE INVENTION

The present invention was conceived in view of the situations and it is therefore an object of the present invention to suppress occurrence of booming sound caused by rotational vibration of a drive source.

To achieve the above object, a first aspect of the present invention provides a control device of a vehicle having (a) a drive source, (b) a power transmission device having a plurality of rotating elements coupled via a gear and a plurality of friction engagement elements selectively coupling the plurality of rotating elements for transmitting an output of the drive source, and (c) a lubricating device supplying a lubrication oil to the friction engagement elements for lubrication, the control device comprising: (d) a lubrication control portion configured to increase an amount of the lubrication oil to the friction engagement elements from the lubricating device in a booming sound generating region predefined with respect to a drive source rotation speed.

A second aspect of the present invention provides the control device of a vehicle recited in the first aspect of the invention, wherein the booming sound generating region is determined by using the drive source rotation speed and a drive source torque as parameters.

A third aspect of the present invention provides the control device of a vehicle recited in the first or second aspect of the invention, wherein depending on an oil temperature of the lubrication oil, the lubrication control portion increases an increment of the lubrication oil amount when the oil temperature is high as compared to when the oil temperature is low.

A fourth aspect of the present invention provides the control device of a vehicle recited in any one of the first to third aspects of the invention, wherein (a) the power transmission device includes a hydraulic power transmission portion including a lock-up clutch on an input side, and wherein (b) the lubrication control portion permits engagement of the lock-up clutch after increasing the lubrication oil amount.

A fifth aspect of the present invention provides the control device of a vehicle recited in any one of the first to fourth aspects of the invention, wherein (a) the power transmission device includes an unloaded rotating element rotated in a dragged manner in a power transmission state and includes a released friction engagement element disposed between a member rotated relatively to the unloaded rotating element and the unloaded rotating element, and wherein (b) the lubrication control portion increases the lubrication oil amount for at least the released friction engagement element.

A sixth aspect of the present invention provides the control device of a vehicle recited in the fifth aspect of the invention, wherein (a) each of the plurality of friction engagement elements is a hydraulic friction engagement device frictionally engaged by a corresponding hydraulic actuator, and wherein (b) the unloaded rotating element is disposed with the hydraulic actuator of the released friction engagement element.

A seventh aspect of the present invention provides the control device of a vehicle recited in any one of the first to sixth aspects of the invention, wherein the drive source is an engine combusting fuel to generate power.

An eighth aspect of the present invention provides the control device of a vehicle recited in the seventh aspect of the invention, wherein the booming sound generating region is an engine rotation speed region in which the booming sound more easily occurs since an explosion vibration of the engine decreases as an engine rotation speed as the drive source rotation speed increases.

A ninth aspect of the present invention provides the control device of a vehicle recited in any one of the first to eighth aspects of the invention, wherein (a) the power transmission device includes a planetary gear type multi-speed transmission selectively engaging a plurality of hydraulic friction engagement devices serving as the friction engagement elements to form each of a plurality of gear positions different in transmission ratio, wherein (b) the vehicle includes a hydraulic control circuit supplying a hydraulic fluid to the plurality of hydraulic friction engagement devices for selective engagement, and wherein (c) the hydraulic control circuit has a function of the lubricating device such that the hydraulic control circuit is configured to supply the remainder of the hydraulic fluid used for engaging the hydraulic friction engagement devices as a lubrication oil for lubricating a friction engagement portion of the hydraulic friction engagement devices, and wherein (d) the lubrication control portion increases a hydraulic pressure of the hydraulic control circuit.

The control device of the vehicle as described above increases the lubrication oil amount to the friction engagement elements in the booming sound generating region predefined with respect to the drive source rotation speed, so that the released friction engagement element is increased in rotational resistance. As a result, the unloaded rotating element rotated in a dragged manner is increased in the drag torque and is rotated in a dragged manner while the backlash in the meshing portion of the gear of the unloaded rotating element with the gear of the loaded rotating element is reduced by being pressed in the rotation load direction, and the inertia of the unloaded rotating element is applied to the loaded rotating element. Since the inertia of the unloaded rotating element is added to the inertia of the loaded rotating element in this way, the rotational vibration of the drive source is appropriately damped, and the occurrence of the booming sound is suppressed.

In the second aspect of the invention, the booming sound generating region is defined by using the drive source rotation speed and the drive source torque as parameters. Therefore, the booming sound generating region can appropriately be set, and the lubrication oil amount may be increased within a minimum necessary range, so that the fuel consumption is restrained from deteriorating due to the increase in the lubrication oil amount.

In the third aspect of the invention, the control device increases the increment of the lubrication oil amount when the oil temperature of the lubrication oil is high as compared to when being low. Therefore, the drag torque attributable to the lubrication oil can appropriately be ensured even when the oil temperature is raised and the viscosity of the lubrication oil is lowered. Additionally, since the drag torque becomes larger due to the increase in the lubrication oil amount during low oil temperature making the viscosity higher, the load of the drive source can be prevented from becoming excessively large and causing an engine stall etc. Therefore, a minimum necessary amount of the lubrication oil can be achieved according to the oil temperature.

In the fourth aspect of the invention, the power transmission device includes the hydraulic power transmission portion including the lock-up clutch on the input side, and the control device permits engagement of the lock-up clutch after increasing the lubrication oil amount. Therefore, the fuel consumption can be improved by the engagement of the lock-up clutch with the occurrence of the booming sound suppressed by the increase in the lubrication oil amount. Specifically, when the lock-up clutch is engaged, the rotational vibration of the drive source is directly transmitted to the power transmission system such as the power transmission device, and the booming sound easily occurs; however, the occurrence of the booming sound is suppressed due to the increase in the lubrication oil amount, so that an engaged region (lock-up region) of the lock-up clutch can be expanded to improve fuel consumption.

In the fifth aspect of the invention, the power transmission device includes the unloaded rotating element rotated in a dragged manner in the power transmission state and includes the released friction engagement element disposed between the member rotated relatively to the unloaded rotating element and the unloaded rotating element, and the control device increases the lubrication oil amount for at least the released friction engagement element. Therefore, the drag torque of the unloaded rotating element is reliably increased, so that the occurrence of the booming sound can be suppressed.

In the sixth aspect of the invention, each of the friction engagement elements is a hydraulic friction engagement device frictionally engaged by the corresponding hydraulic actuator, and the unloaded rotating element is disposed with the hydraulic actuator of the released friction engagement element. Since the unloaded rotating element has the large inertia (mass), for example, in the rotation speed region in which the rotational vibration of the drive source is large so that the collision of the unloaded rotating element with the gear of the loaded rotating element is repeated, the unloaded rotating element is rotated in a dragged manner while maintaining the meshing state with the gear of the loaded rotating element (a pressing state in the rotation load direction) and functions as a loaded rotating element, so that the rotational vibration of the drive source can appropriately be damped to suppress the occurrence of the booming sound. On the other hand, when the drive source rotation speed rises and the rotational vibration decreases, the collision of the unloaded rotating element with the gear of the loaded rotating element is reduced or eliminated, resulting in the inertia loss of the unloaded rotating element, which makes it difficult to damp the rotational vibration of the drive source, so that the booming sound possibly occurs due to the rotational vibration; however, since the lubrication oil amount is increased in the booming sound generating region, the increased drag torque suppresses the inertia loss of the unloaded rotating element so that the occurrence of the booming sound is appropriately suppressed.

In the seventh aspect of the invention, the engine combusting fuel to generate power is used as the drive source. Although the booming sound tends to occur due to the rotational vibration resulting from the explosion of the engine, the lubrication oil amount is increased in the booming sound generating region, and therefore, the inertia of the unloaded rotating element is applied to the loaded rotating element due to the increase in the drag torque, so that the rotational vibration is appropriately damped to suppress the occurrence of the booming sound.

In the eighth aspect of the invention, the booming sound generating region is the engine rotation speed region in which the booming sound more easily occurs since the explosion vibration of the engine decreases as the engine rotation speed increases. That is, the booming sound generating region is defined as the engine rotation speed region in which the inertia loss of the unloaded rotating element occurs, and the lubrication oil amount is increased in the engine rotation speed region. Therefore, the lubrication oil amount is increased in the minimum necessary engine rotation speed region for the suppression of occurrence of the booming sound, and the fuel consumption is restrained from deteriorating due to the increase in the lubrication oil amount.

In the ninth aspect of the invention, the power transmission device includes the multi-speed transmission selectively engaging the plurality of hydraulic friction engagement devices to form each of the plurality of gear positions different in transmission ratio, and the hydraulic control circuit is configured to supply the remainder of the hydraulic fluid used for engaging the hydraulic friction engagement devices as a lubrication oil. Therefore, the lubrication oil amount can be increased by increasing the hydraulic pressure of the hydraulic control circuit (line pressure), and the occurrence of the booming sound can appropriately be suppressed by increasing the lubrication oil amount.

BRIEF DESCRIPTION OF DRAWINGS

FIG. 4 is an operation chart for explaining multiple gear positions of the automatic transmission of FIG. 2 and engagement devices establishing each gear position;

DESCRIPTION OF THE PREFERRED EMBODIMENTS

Figure 1:
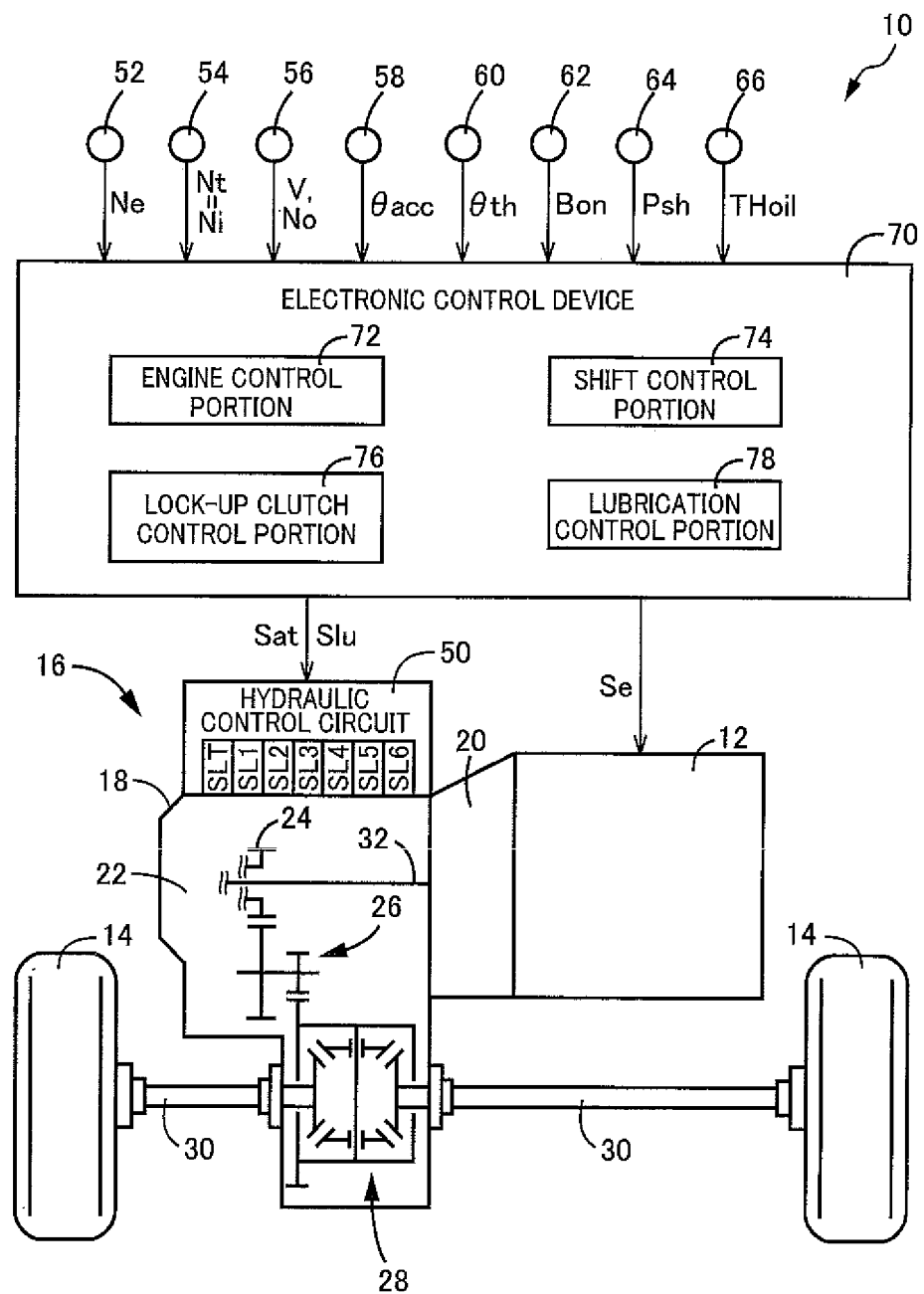
FIG. 1 is a diagram for explaining a general configuration of a vehicle to which the present invention is applied and is a diagram for explaining main portions of a control function and a control system for various controls in the vehicle.

A drive source used is an engine such as an internal combustion engine combusting fuel to generate power, an electric motor, etc. The engine has a rotational vibration due to explosion causing a booming sound, and the electric motor has a rotational vibration due to pulsation of torque causing a booming sound. A power transmission device is configured to include a multi-speed transmission, a forward/reverse switching device, etc. of a planetary gear type, a parallel shaft type, etc., and is provided with a hydraulic power transmission portion such as a torque converter as needed. Friction engagement elements of this power transmission device are single-plate or multiplate type clutches, brakes, etc. and are frictionally engaged by hydraulic pressure, for example, or may be frictionally engaged based on electromagnetic force etc. Regarding a lubricating device, for example, when the remainder of hydraulic fluid for engaging a hydraulic friction engagement device is supplied as a lubrication oil, a lubrication oil amount can be increased by increasing a hydraulic pressure (such as line pressure) of a hydraulic control circuit, or when a lubrication supply oil passage is provided for supplying the lubrication oil to a predetermined lubrication site, the oil pressure of the lubrication supply oil passage can be controlled to increase the lubrication oil amount, and other various forms are available depending on the hydraulic control circuit.

A booming sound generating region can be determined based only on a drive source rotation speed, for example; however, the region is desirably determined by using the drive source rotation speed and a drive source torque as parameters. This booming sound generating region is desirably determined depending on a power transmission state of the power transmission device. For example, in the case of a multi-speed transmission capable of forming multiple gear positions, the booming sound generating region is desirably set for each of the gear positions. An increment of the lubrication oil or an increased amount of the lubrication oil may be a constant amount or may be varied by using the drive source rotation speed and/or the drive source torque as parameters. Alternatively, the increment or the amount may be varied in a stepwise or continuous manner based on other physical quantities such as an oil temperature related to a drag torque.

The power transmission device has a loaded rotating element involved in power transmission and an unloaded rotating element not involved in power transmission depending on a power transmission state, and the unloaded rotating element is originally only rotated in a dragged manner and has almost no load; however, for example, if the drive source causes a large fluctuation in rotation as in an engine, the unloaded rotating element repeatedly collides in both forward and backward directions with a gear of the loaded rotating element involved in power transmission and is thereby rotated in a dragged manner while the inertia of the unloaded rotating element is applied to the loaded rotating element, and the rotational vibration of the drive source is damped so that the occurrence of the booming sound is suppressed. Particularly, when a hydraulic actuator etc. for the friction engagement element are provided in the unloaded rotating element, the rotational vibration can appropriately be damped because of the large inertia (mass). In this case, an increase in the drive source rotation speed and a decrease in the rotational vibration possibly result in the occurrence of the booming sound in the rotation speed region in which an inertia loss of the unloaded rotating element occurs, and the booming sound can appropriately be suppressed by increasing the lubrication oil amount. Even when the hydraulic actuator etc. are not provided in the unloaded rotating element and the inertia is relatively small, the booming sound may occur due to the inertia loss, and the present invention may be applied. For example, even when the rotational vibration is relatively small as in an electric motor and the unloaded rotating element is only rotated in a dragged manner in a substantially no-load state, the present invention may be applied as well if the booming sound occurs due to resonance etc. resulting from the rotational vibration of the drive source.

Example

An example of the present invention will now be described in detail with reference to the drawings. In the following example, the figures are simplified or deformed as needed and portions are not necessarily precisely drawn in terms of dimension ratio, shape, etc.

FIG. 1 is a diagram for explaining a general configuration of a vehicle 10 to which the present invention is applied and is a diagram for explaining main portions of a control system for various controls in the vehicle 10. In FIG. 1, the vehicle 10 includes an engine 12, drive wheels 14, and a power transmission device 16 disposed in a power transmission path between the engine 12 and the drive wheels 14. The power transmission device 16 is a transaxle including, in a case 18 serving as a non-rotating member attached to a vehicle body, a torque converter 20, an automatic transmission 22, a reduction gear mechanism 26 coupled to a transmission output gear 24 that is an output rotating member of the automatic transmission 22, a differential device 28 coupled to the reduction gear mechanism 26, etc. The power transmission device 16 also includes a pair of drive shafts (axles) 30 etc. coupled to the differential device 28. In the power transmission device 16, the power output from the engine 12 is transmitted sequentially through the torque converter 20, the automatic transmission 22, the reduction gear mechanism 26, the differential device 28, the drive shaft 30, etc. to the drive wheels 14. The torque converter 20 corresponds to a hydraulic power transmission portion.

The engine 12 is a drive source of the vehicle 10 and is an internal combustion engine such as a gasoline engine and a diesel engine combusting fuel to generate power. The engine 12 has an engine torque Te controlled by an electronic control device 70 controlling operating states such as an intake air amount, a fuel supply amount, and an ignition timing.

Figure 2:
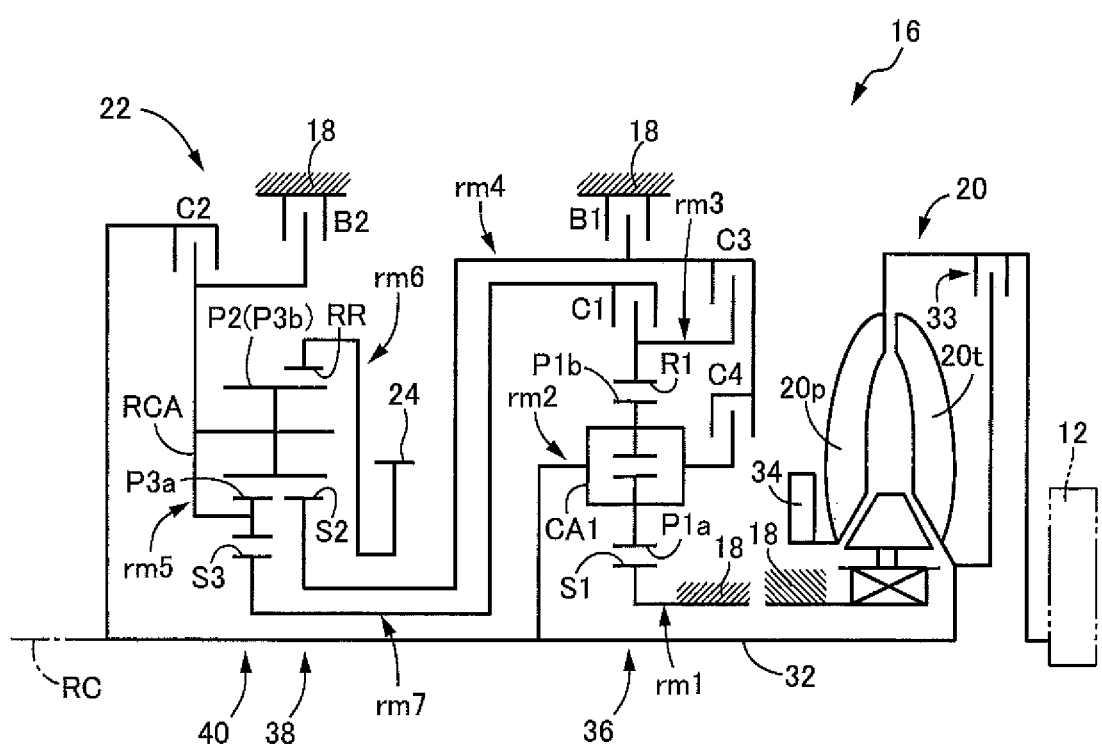
FIG. 2 is a skeleton diagram for explaining a specific example of the automatic transmission of FIG. 1.
Figure 3:
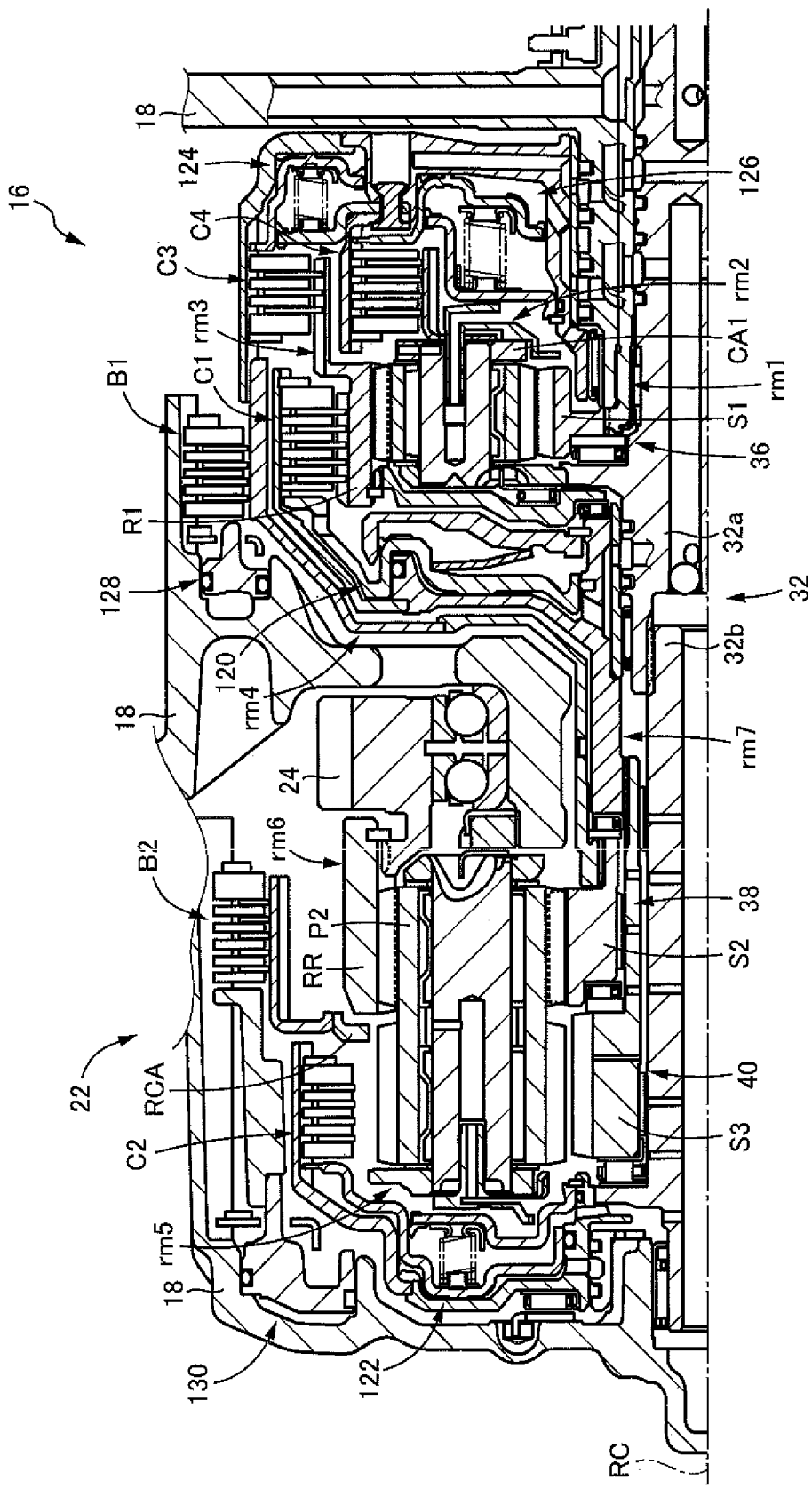
FIG. 3 is a cross-sectional view of the automatic transmission of FIG. 2.

FIG. 2 is a schematic for explaining an example of the torque converter 20 and the automatic transmission 22. FIG. 3 is a cross-sectional view of the automatic transmission 22 shown in FIG. 2. The torque converter 20, the automatic transmission 22, etc. are configured substantially symmetrically with respect to an axial center RC of a transmission input shaft 32 that is an input rotating member of the automatic transmission 22 and have lower halves from the axial center RC not shown in FIGS. 2 and 3.

In FIG. 2, the torque converter 20 is disposed to rotate around the axial center RC in a power transmission path between the engine 12 and the automatic transmission 22 and is a hydraulic power transmission device including a pump impeller 20$p$, a turbine impeller 20$t$, etc. The pump impeller 20$p$ is an input rotating member of the torque converter 20 and is coupled to the engine 12. The turbine impeller 20$t$ is an output rotating member of the torque converter 20 and is coupled to the transmission input shaft 32. The transmission input shaft 32 also serves as a turbine shaft rotationally driven by the turbine impeller 20$t$. The torque converter 20 also includes a lock-up clutch 33 as a direct-coupling clutch coupling the pump impeller 20$p$ and the turbine impeller 20$t$, i.e., coupling the input/output rotating members of the torque converter 20. The power transmission device 16 also includes a mechanical oil pump 34 coupled to the pump impeller 20$p$. The oil pump 34 is rotationally driven by the engine 12 to discharge a hydraulic fluid (also used as a lubrication oil) used for a shift control of the automatic transmission 22, for a switching control of an operation state of the lock-up clutch 33, and for supplying the lubrication oil to portions of the power transmission device 16. Therefore, the hydraulic fluid pumped up by the oil pump 34 is supplied as a source pressure of a hydraulic control circuit 50 (see FIGS. 1 and 5) included in the vehicle 10.

The lock-up clutch 33 is a hydraulic friction clutch frictionally engaged by a lock-up engagement hydraulic pressure Plu supplied from the hydraulic control circuit 50. The lock-up clutch 33 has an operation state switched by the electronic control device 70 controlling the lock-up engagement hydraulic pressure Plu. The operation state of the lock-up clutch 33 includes a lock-up release state in which the lock-up clutch 33 is released, a slip state in which the lock-up clutch 33 is engaged with slipping, and a lock-up state in which the lock-up clutch 33 is completely engaged. Releasing the lock-up clutch 33 provides a torque amplifying effect to the torque converter 20. When the lock-up clutch 33 is engaged (locked up), the pump impeller 20$p$ and the turbine impeller 20$t$ are integrally rotated, and the power of the engine 12 is directly transmitted toward the automatic transmission 22. By operating the lock-up clutch 33 with slipping such that a slip amount Ns (=engine rotation speed Ne−turbine rotation speed Nt; also referred to as a slip rotation speed or a differential rotation speed) attains a target slip amount Nst in the lock-up clutch 33, racing of the engine rotation speed Ne is suppressed and a noise such as booming sound is suppressed during a driving state (power-on) of the vehicle 10, and the engine 12 is caused to rotate in accordance with the transmission input shaft 32 with the target slip amount Nst and, for example, a fuel cut region in which fuel supply for the engine 12 is stopped is expanded during a driven state (power-off) of the vehicle 10.

In FIGS. 2 and 3, the automatic transmission 22 is an automatic transmission of a multi-speed type (multi-speed transmission) constituting a portion of the power transmission path between the engine 12 and the drive wheels 14. The automatic transmission 22 is a planetary gear type multi-speed transmission having a double pinion type first planetary gear device 36 as well as a single pinion type second planetary gear device 38 and a double pinion type third planetary gear device 40 formed as a Ravigneaux type, on a coaxial line (on the axial center RC). The automatic transmission 22 includes a first clutch C1, a second clutch C2, a third clutch C3, a fourth clutch C4, a first brake B1, and a second brake B2 as multiple friction engagement elements (hereinafter simply referred to as friction engagement elements CB if not particularly distinguished). All these friction engagement elements CB are hydraulic friction engagement devices frictionally engaged by hydraulic pressure. As shown in FIG. 3, the transmission input shaft 32 of the automatic transmission 22 includes a first rotating shaft 32$a$ coupled to the turbine impeller 20$t$ of the torque converter 20, and a second rotating shaft 32$b$ spline-fitted to the first rotating shaft 32$a$ and thereby integrally rotated with the first rotating shaft 32$a$.

The first planetary gear device 36 includes a first sun gear S1, a plurality of pairs of first planetary gears P1$a$, P1$b$ meshing with each other, a first carrier CA1 supporting the first planetary gears P1$a$, P1$b$ such that the first planetary gears P1$a$, P1$b$ are rotatable about its axis and an axis of the first planetary gear device, and a first ring gear R1 meshing via the first planetary gears P1a, P1b with the first sun gear S1. The second planetary gear device 38 includes a second sun gear S2, a second planetary gear P2, a carrier RCA supporting the second planetary gear P2 such that the second planetary gear P2 is rotatable about its axis and an axis of the second planetary gear device, and a ring gear RR meshing via the second planetary gear P2 with the second sun gear S2. The third planetary gear device 40 includes a third sun gear S3, a plurality of pairs of third planetary gears P3a, P3b meshing with each other, a carrier RCA supporting the third planetary gears P3a, P3b such that the third planetary gears P3a, P3b are rotatable about its axis and an axis of the third planetary gear device, and a ring gear RR meshing via the third planetary gears P3a, P3b with the third sun gear S3. In the second planetary gear device 38 and the third planetary gear device 40, the third planetary gear P3b and the second planetary gear P2 are commonalized, and the carriers are made up of the common carrier RCA while the ring gears are made up of the common ring gear RR, so that a so-called Ravigneaux type is achieved.

The friction engagement elements CB are hydraulic friction engagement devices made up of multiplate or single-plate type clutches and brakes pressed by hydraulic actuators, band brakes fastened by hydraulic actuators, etc. The friction engagement elements CB have respective torque capacities (engagement torques) Tcb changed in accordance with regulated engagement hydraulic pressures Pcb output respectively from linear solenoid valves SL1 to SL6 (see FIG. 5) in the hydraulic control circuit 50 included in the vehicle 10, so that respective operation states (states such as engagement and release) of the friction engagement elements CB are switched.

The automatic transmission 22 includes a first rotating element rm1 having a first sun gear S1, a second rotating element rm2 having a first carrier CA1, a third rotating element rm3 having a first ring gear R1, a fourth rotating element rm4 having a second sun gear S2, a fifth rotating element rm5 having a carrier RCA, a sixth rotating element rm6 having a ring gear RR, and a seventh rotating element rm7 having a third sun gear S3. The first rotating element rm1 is integrally fixed to the case 18. The second rotating element rm2 is integrally coupled to the transmission input shaft 32 and is selectively coupled to the fourth rotating element rm4 via the fourth clutch C4. The third rotating element rm3 is selectively coupled to the seventh rotating element rm7 via the first clutch C1 and selectively coupled to the fourth rotating element rm4 via the third clutch C3. The fourth rotating element rm4 is selectively fixed to the case 18 via the first brake B1. The fifth rotating element rm5 is selectively coupled to the transmission input shaft 32 and the second rotating element rm2 via the second clutch C2 and selectively fixed to the case 18 via the second brake B2. The sixth rotating element rm6 is integrally coupled to the transmission output gear 24. In this example, since the first rotating element rm1 is fixed, six elements from the second rotating element rm2 to the seventh rotating element rm7 substantially function as the rotating elements.

The automatic transmission 22 is a multi-speed transmission having multiple gear positions different in transmission ratio 7 (=input rotation speed Ni/output rotation speed No) selectively formed by the electronic control device 70 selective engaging any of the friction engagement elements CB according to an accelerator opening degree θacc, a vehicle speed V, etc. For example, as shown in an engagement operation table of FIG. 4, the automatic transmission 22 has eight forward gear positions from a first speed gear position "1st" to an eighth speed gear position "8th" and a reverse gear position "Rev" such that the gear positions are selectively formed. The input rotation speed Ni is a rotation speed of the transmission input shaft 32 (i.e., an input rotation speed of the automatic transmission 22), and the output rotation speed No is a rotation speed of the transmission output gear 24 (i.e., an output rotation speed of the automatic transmission 22). The transmission ratio γ of the automatic transmission 22 corresponding to each of the gear positions is appropriately defined by gear ratios (=the number of teeth of the sun gear/the number of teeth of the ring gear) ρ1, ρ2, ρ3 of the first planetary gear device 36, the second planetary gear device 38, and the third planetary gear device 40. The transmission ratio γ of the gear positions is the highest at the first speed gear position "1st" and decreases toward the higher speed gear side, i.e., the eighth speed gear position "8th" side.

The engagement operation table of FIG. 4 represents the relationship between the gear positions established in the automatic transmission 22 and the operation states of the friction engagement elements CB, and "O" and a blank indicate engagement and release of the friction engagement elements CB, respectively. As shown in FIG. 4, among the forward gear positions, the first speed gear position "1st" is established by engagement of the first clutch C1 and the second brake B2. The second speed gear position "2nd" is established by engagement of the first clutch C1 and the first brake B1. The third speed gear position "3rd" is established by engagement of the first clutch C1 and the third clutch C3. The fourth speed gear position "4th" is established by engagement of the first clutch C1 and the fourth clutch C4. The fifth speed gear position "5th" is established by engagement of the first clutch C1 and the second clutch C2. The sixth speed gear position "6th" is established by engagement of the second clutch C2 and the fourth clutch C4. The seventh speed gear position "7th" is established by engagement of the second clutch C2 and the third clutch C3. The eighth speed gear position "8th" is established by engagement of the second clutch C2 and the first brake B1. The reverse gear position "Rev" is established by engagement of the third clutch C3 and the second brake B2. When the six friction engagement elements CB are all released, the automatic transmission 22 is brought into a neutral state in which no gear position is established i.e., a neutral state in which power transmission is interrupted.

Figure 5:
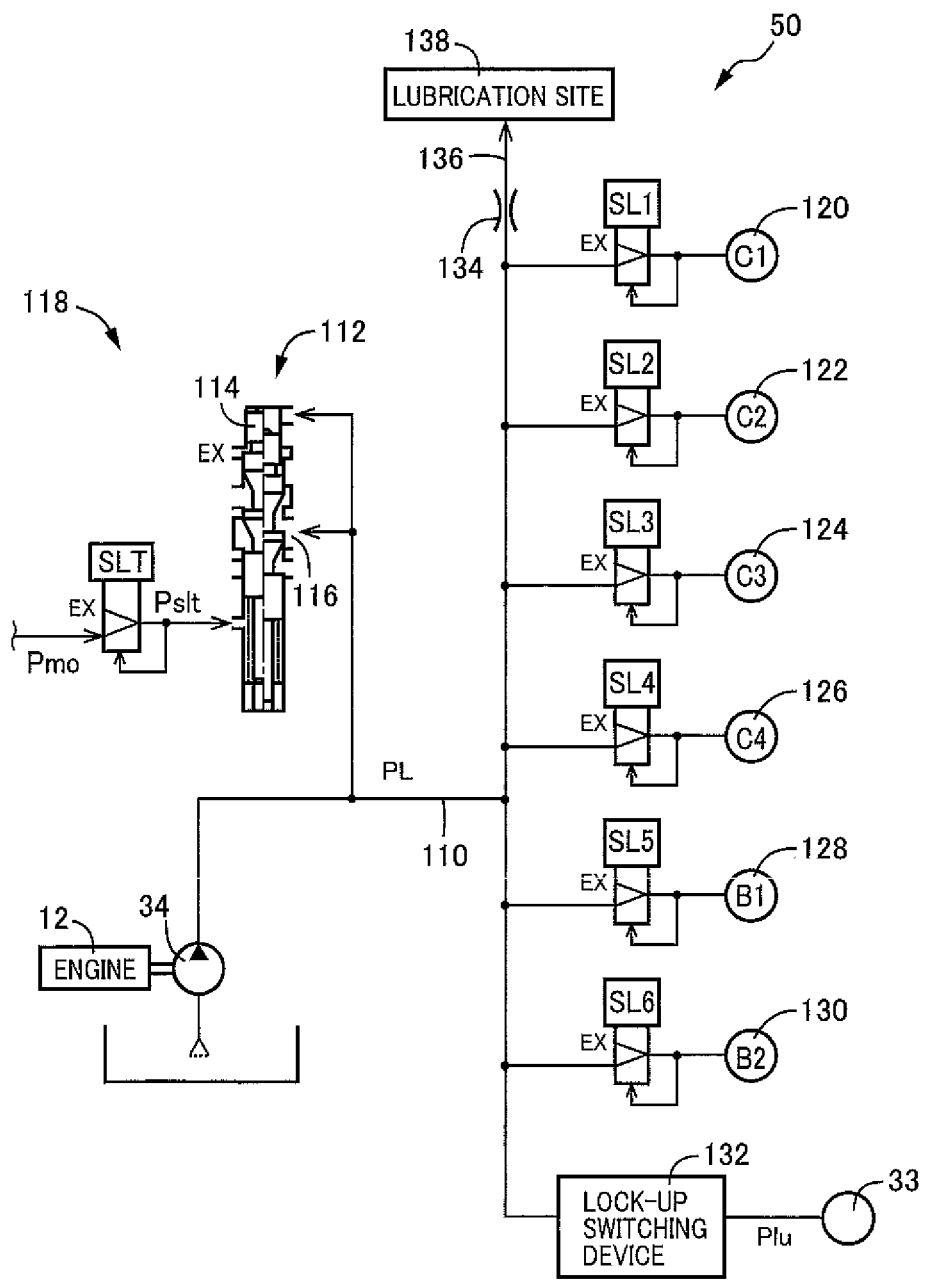
FIG. 5 is a circuit diagram for explaining a hydraulic control circuit related to clutches C1 to C4, brakes B1, B2, and a lock-up clutch of the automatic transmission of FIG. 2.

FIG. 5 is a circuit diagram of a main portion of the hydraulic control circuit 50 including the linear solenoid valves SL1 to SL6 providing an engagement/release control of the friction engagement elements CB. The hydraulic control circuit 50 includes as a hydraulic pressure source the mechanical oil pump 34 rotationally driven by the engine 12. The hydraulic fluid output from the oil pump 34 is supplied to a line pressure oil passage 110 and regulated to a predetermined line pressure PL by a line pressure control valve 112 such as a primary regulator valve. A linear solenoid valve SLT is coupled to the line pressure control valve 112, and the linear solenoid valve SLT is electrically controlled by the electronic control device 70 to output a signal pressure Pslt by using a substantially constant modulator oil pressure Pmo as a source pressure. When the signal pressure Pslt is supplied to the line pressure control valve 112, a spool 114 of the line pressure control valve 112 is urged by the signal pressure Pslt, and the spool 114 is axially moved while changing an opening area of a discharge flow passage 116, so that the line pressure PL is regulated in accordance with the signal pressure Pslt. The line pressure PL is regulated in accordance with, for example, the accelerator opening degree $\theta acc$ that is an output required amount. The linear solenoid valve SLT is an electromagnetic pressure regulating valve for line pressure regulation, and the line pressure control valve 112 is a hydraulic control valve regulating the line pressure PL according to the signal pressure Pslt supplied from the linear solenoid valve SLT. The line pressure control valve 112 and the linear solenoid valve SLT are included to constitute a relief type line pressure regulating device 118.

The hydraulic fluid of the line pressure PL regulated by the line pressure regulating device 118 is supplied through the line pressure oil passage 110 to the linear solenoid valves SL1 to SL6 etc. The linear solenoid valves SL1 to SL6 are disposed correspondingly to respective hydraulic actuators (hydraulic cylinders) 120, 122, 124, 126, 128, 130 of the clutches C1 to C4 and the brakes B1, B2, and output hydraulic pressures (engagement hydraulic pressures Pcb) are respectively controlled in accordance with a shift control command signal Sat supplied from the electronic control device 70 to individually provide the engagement/release control of the clutches C1 to C4 and the brakes B1, B2 so as to form one of the forward gear positions from the first speed gear position "1st" to the eighth speed gear position "8th" or the reverse gear position "Rev".

The line pressure oil passage 110 is also provided with a lock-up switching device 132 switching the engagement/release state of the lock-up clutch 33 in accordance with a lock-up control command signal Slu supplied from the electronic control device 70. The lock-up switching device 132 is configured to include linear solenoid valves etc. for hydraulic control and for oil passage switching and can regulate and control the lock-up engagement hydraulic pressure Plu supplied to the lock-up clutch 33 to switch the lock-up clutch 33 among a released state (the lock-up release state), the predetermined slip state, and a completely engaged state (the lock-up state).

A lubrication oil passage 136 is further connected through a restrictor 134 to the line pressure oil passage 110 so that the remainder of the hydraulic fluid for engaging the friction engagement elements CB and the lock-up clutch 33 is supplied as the lubrication oil from the restrictor 134 through the lubrication oil passage 136 to a lubrication site 138. The lubrication site 138 is friction engagement portions of the friction engagement elements CB, i.e., portions in which multiple friction plates are arranged to overlap in an axially movable manner, meshing portions of the various gears (S1 to S3, P1a, P1b, P2, P3a, R1, RR) of the automatic transmission 22, rotation support portions rotatably supporting the rotating elements rm2 to rm7, etc. The hydraulic control circuit 50 has a function of a lubricating device lubricating the friction engagement portions of the friction engagement elements CB.

Returning to FIG. 1, the vehicle 10 includes the electronic control device 70 as a controller providing various controls of the vehicle 10 including the engagement/release control of the friction engagement elements CB and the lock-up clutch 33. The electronic control device 70 includes a so-called microcomputer including a CPU, a RAM, a ROM, and an I/O interface, for example, and the CPU executes signal processes in accordance with programs stored in advance in the ROM, while utilizing a temporary storage function of the RAM, to provide the various controls of the vehicle 10. The electronic control device 70 is configured separately for the engine control, the shift control, etc. as needed.

The electronic control device 70 is supplied with various pieces of information necessary for the various controls from an engine rotation speed sensor 52, an input rotation speed sensor 54, an output rotation speed sensor 56, an accelerator opening degree sensor 58, a throttle valve opening degree sensor 60, a brake switch 62, a shift position sensor 64, an oil temperature sensor 66, etc., which are disposed on the vehicle 10, such as the engine rotation speed Ne, the input rotation speed (rotation speed of the transmission input shaft 32) Ni, the output rotation speed (rotation speed of the transmission output gear 24) No corresponding to the vehicle speed V, the accelerator opening degree $\theta acc$ that is an operation amount of an accelerator pedal, a throttle valve opening degree $\theta th$ that is an opening degree of an electronic throttle valve, a brake-on signal Bon representative of a brake operation state when a driver operates a brake operation member for operating a wheel brake, an operation position (shift position) Psh of a shift lever selecting a power transmission state such as forward running and reverse running, and an oil temperature THoil that is a temperature of hydraulic fluid in the hydraulic control circuit 50. The electronic control device 70 outputs an engine control command signal Se for controlling an operation state of the engine 12, the shift control command signal Sat for controlling the operation state of the friction engagement elements CB, the lock-up control command signal Slu for controlling the operation state of the lock-up clutch 33, etc.

The electronic control device 70 functionally includes an engine control portion 72, a shift control portion 74, a lock-up clutch control portion 76, and a lubrication control portion 78.

The engine control portion 72 controls the engine 12 such that the requested engine torque Te is acquired. For example, the engine control portion 72 calculates a required drive torque Tdem from a relationship (e.g., drive force map) predefined by using the accelerator opening degree $\theta acc$ and the vehicle speed V as parameters, obtains a target engine torque Tetgt at which the required drive torque Tdem is achieved, and outputs the engine control command signal Se for controlling the engine 12 to acquire the target engine torque Tetgt to a throttle actuator, a fuel injection device, an ignition device, etc.

The shift control portion 74 provides the shift control of the automatic transmission 22. For example, the shift control portion 74 sets a target gear position of the automatic transmission 22 according to a relationship (e.g., transmission shift map) predefined by using the vehicle speed V and the accelerator opening degree $\theta acc$ as parameters, makes a comparison with the current gear position, and provides the shift control, as needed such that the target gear position is established. Specifically, the shift control portion 74 outputs to the hydraulic control circuit 50 the shift control command signal Sat for switching the operation state of the friction engagement elements CB to establish the target gear position. The shift control portion 74 also outputs to the hydraulic control circuit 50 the shift control command signal Sat for switching the gear position of the automatic transmission 22 according to a driver's shift instruction given through a manual operation of an up/down switch, a lever, etc.

The lock-up clutch control portion 76 controls the operation state of the lock-up clutch 33. For example, the lock-up clutch control portion 76 determines whether the clutch is in a released region, a slip region, or a lock-up region according to a relationship (e.g., a lock-up region diagram) predefined by using the vehicle speed V and the accelerator opening degree $\theta acc$ as parameters and outputs to the hydraulic control circuit 50 the lock-up control command signal Slu for supplying the lock-up clutch 33 with the lock-up engagement hydraulic pressure Plu at which the operation state corresponding to the determined region is achieved. If it is determined that the lock-up clutch is in the lock-up region, the lock-up clutch control portion 76 sets the lock-up engagement hydraulic pressure Plu for acquiring the torque capacity of the lock-up clutch 33 capable of transmitting the engine torque Te to provide a lock-up control for the lock-up of the lock-up clutch 33. If it is determined that the lock-up clutch is in the slip region, the lock-up clutch control portion 76 sets the lock-up engagement hydraulic pressure Plu for achieving the target slip amount Nst with respect to the engine torque Te to provide a slip control for the slip engagement of the lock-up clutch 33. For example, the lock-up engagement hydraulic pressure Plu is feedback-controlled to achieve the target slip amount Nst. In the lock-up region diagram, the slip region is set in a low vehicle speed region as compared to the lock-up region, for example, and is a region for improving fuel consumption and drivability by employing the slip state of the lock-up clutch 33 in a region in which the lock-up control is difficult to provide. The slip region is also a region set in consideration of drivability, booming sound, etc. Therefore, the target slip amount Nst is determined to have a larger value in a region with a larger engine torque Te and a region with a lower engine rotation speed Ne that are disadvantageous for the booming noise etc. associated with the lock-up.

From the viewpoint of improving fuel consumption, it is effective to engage the lock-up clutch 33. On the other hand, one of the transmission paths of the booming sound is a path allowing transmission of the explosion vibration of the engine 12 through the drive shaft 30 to the vehicle body (body). During running of the vehicle 10 with the lock-up clutch 33 engaged (also referred to as lock-up running), the explosion vibration of the engine 12 is hardly damped (i.e., the torque variation of the drive shaft 30 tends to become larger), and the booming sound tends to increase. Therefore, a low rotation region of the engine 12 associated with a larger explosion vibration of the engine 12 as compared to a high rotation range of the engine 12 is defined as the lock-up released region or the slip region. If the occurrence of the booming sound during the lock-up running can be suppressed (i.e., the torque variation of the drive shaft 30 can be reduced), the lock-up region can be expanded.

Figure 6:
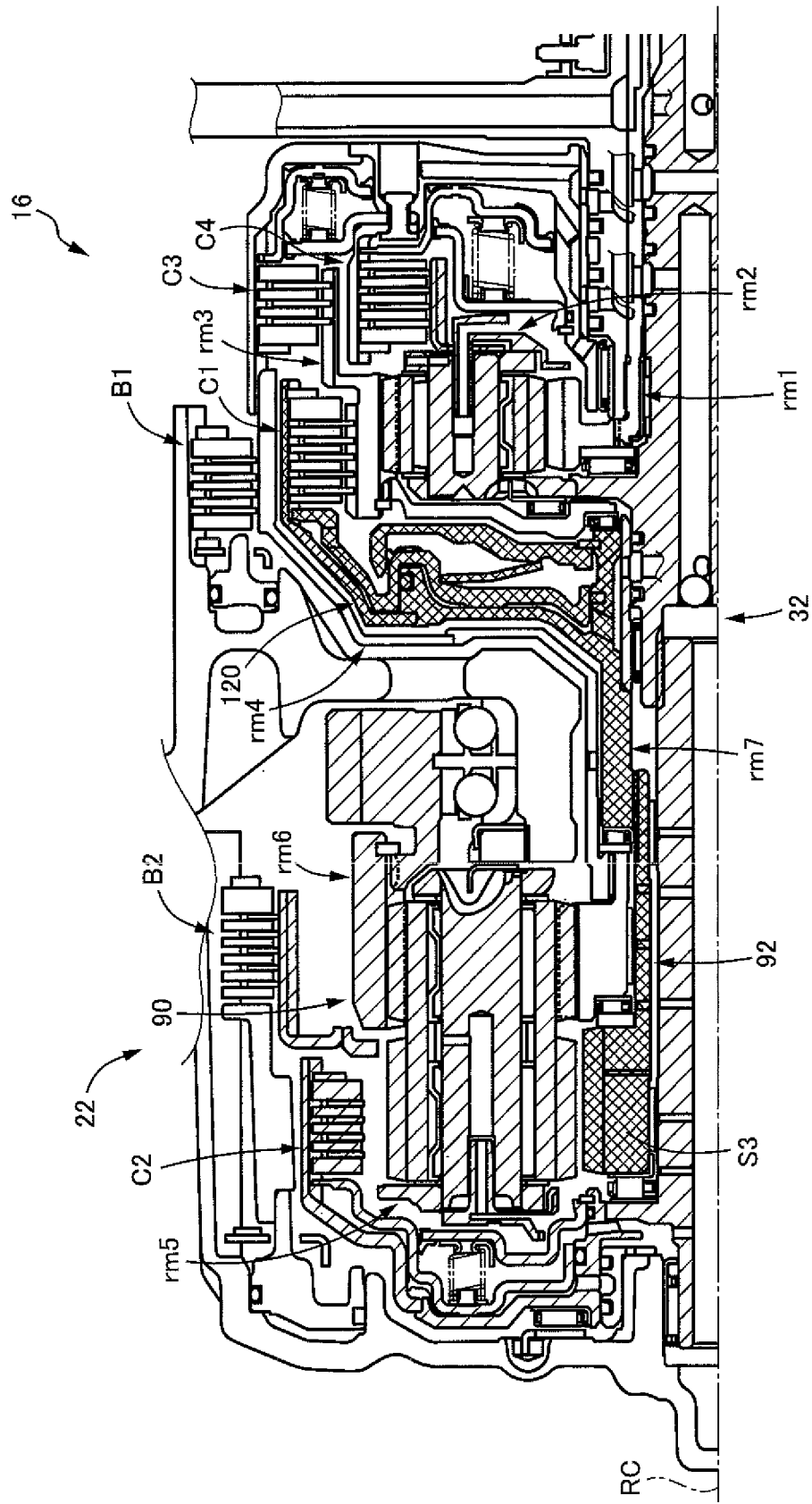
FIG. 6 is a cross-sectional view of the automatic transmission of FIG. 2 for explaining a loaded rotating element and an unloaded rotating element when an eighth speed gear position "8th" is formed.

For each gear position, the automatic transmission 22 has a loaded portion 90 (e.g., a portion with diagonal lines of FIG. 6) that is a site involved in power transmission, i.e., a site on a torque flow, and an unloaded portion 92 (e.g., a cross-hatched portion of FIG. 6) that is a site not involved in power transmission, i.e., a site only rotated in a dragged manner without transmitting power. FIG. 6 is a cross-sectional view of the automatic transmission 22 for explaining the loaded portion 90 and the unloaded portion 92 when the eighth speed gear position "8th" is formed. In FIG. 6, the eighth speed gear position "8th" is established by engaging the second clutch C2 and the first brake B1 and releasing the first clutch C1, the third clutch C3, the fourth clutch C4, and the second brake B2, and therefore, the loaded portion 90 and the unloaded portion 92 are present as indicated by diagonal lines and by cross-hatching, respectively. The loaded portion 90 corresponds to loaded rotating elements, i.e., the second rotating element rm2 integrally coupled to the transmission input shaft 32, the fifth rotating element rm5 coupled to the transmission input shaft 32 via the second clutch C2, and the sixth rotating element rm6 integrally coupled to the transmission output gear 24. The unloaded portion 92 corresponds to an unloaded rotating element, i.e., the seventh rotating element rm7 engaged with the third planetary gear P3a via the third sun gear S3 and rotated in a dragged manner.

A gear backlash is present in a coupling portion between the loaded portion 90 and the unloaded portion 92, for example, a meshing portion between the third planetary gear P3a and the third sun gear S3 when the eighth speed gear position "8th" is formed. Since no torque is transmitted between the loaded portion 90 and the unloaded portion 92, the unloaded portion 92 is originally rotated in a dragged manner within a range of the backlash while relatively moving (idly rotating) with respect to the loaded portion 90. However, in the region in which the explosion vibration of the engine 12 is large as in the low rotation region of the engine 12, the third sun gear S3 is caused to alternately collide with the tooth surfaces of the third planetary gear P3a in both the forward and backward directions due to the rotational vibration and is rotated in a dragged manner while the inertia of the unloaded portion 92 is applied to the loaded portion 90. When the inertia of the loaded portion 90 increases in this way, the rotational vibration of the engine 12 is damped, and the occurrence of the booming sound caused by the rotational vibration is suppressed. On the other hand, when the rotation speed Ne of the engine 12 increases, the rotational vibration due to the explosion decreases, so that the alternate collision of both tooth surfaces of the third sun gear S3 and the third planetary gear P3a is reduced or eliminated, and the inertia from the unloaded portion 92 disappears (inertia loss), which makes it difficult to damp the rotational vibration of the engine 12, and the rotational vibration is transmitted to the drive shaft 30, leading to deterioration of the booming sound. In the case of FIG. 6, since the hydraulic actuator 120 of the first clutch C1 is disposed on the seventh rotating element rm7 that makes up the unloaded portion 92 and has a large mass, the inertia of the loaded portion 90 is increased in the low rotation region in which the explosion vibration of the engine 12 is large, so that the rotational vibration of the engine 12 is appropriately damped and, on the other hand, if the engine rotation speed Ne rises and the inertia loss of the unloaded portion 92 occurs, a significant reduction in the inertia of the loaded portion 90 makes it difficult to damp the rotational vibration, resulting in a noticeable deterioration of the booming sound.

Figure 7:
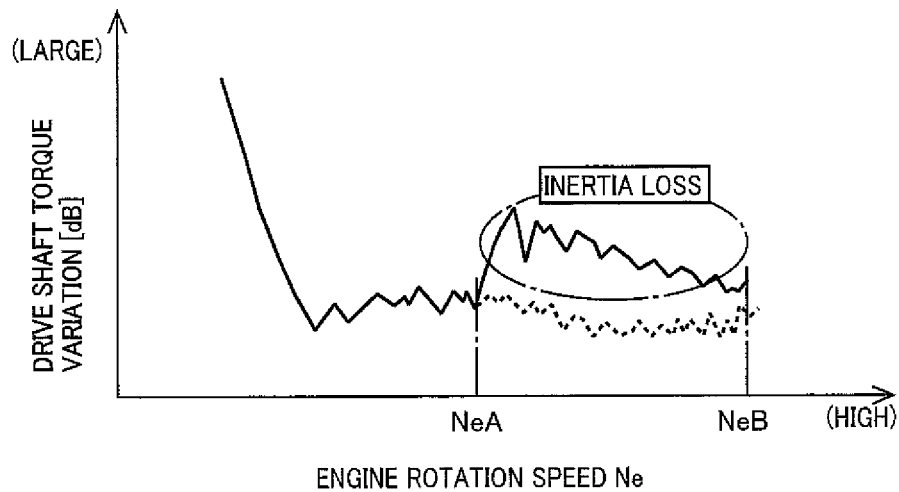
FIG. 7 is a diagram of an exemplary relationship between an engine rotation speed and a drive shaft torque variation at a predetermined gear position of the automatic transmission, showing a comparison between when a lubrication oil amount is increased (broken line) and when a lubrication oil amount is not increased (solid line)

FIG. 7 is a graph showing a relationship between the engine rotation speed Ne and the torque variation of the drive shaft 30 at a predetermined gear position in the lock-up state in which the lock-up clutch 33 is engaged. In FIG. 7, the drive shaft torque variation indicates a magnitude of the torque variation of the drive shaft 30 when the explosion vibration of the engine 12 is transmitted. A solid line of FIG. 7 indicates the case of the drive shaft torque variation increased by the inertia loss of the unloaded portion 92, and the booming sound deteriorates due to the increase in the torque variation. In FIG. 7, a region of the engine rotation speed Ne from NeA to NeB corresponds to an increase region of the drive shaft torque variation, i.e., a booming sound generating region.

Figure 8:
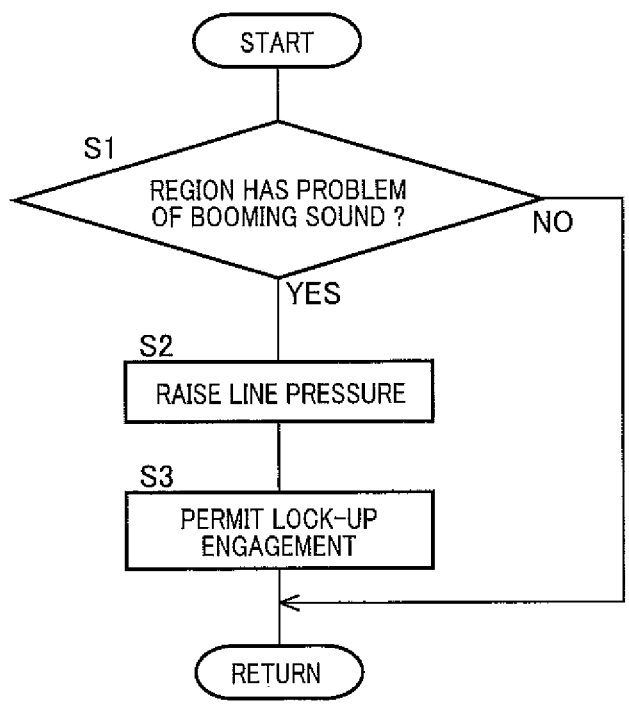
FIG. 8 is a flowchart for specifically explaining an operation of a lubrication control portion of FIG. 1.

The electronic control device 70 of this example functionally includes the lubrication control portion 78 and executes a signal process according to steps S to S3 of a flowchart shown in FIG. 8 to increase a lubrication oil amount for the released friction engagement element CB (the first clutch C1 of FIG. 6) between the unloaded portion 92 rotated in a dragged manner and a member rotating relatively to the unloaded portion 92 at lower rotation speed than the unloaded portion 92 (i.e. the third rotating element rm3 of FIG. 6), thereby increasing the drag torque of the unloaded portion 92 to suppress the inertia loss. The electronic control device 70 corresponds to a control device of the vehicle 10.

At step S1 of FIG. 8, it is determined whether a state of the vehicle 10 is in a region where booming sound is problem, i.e., whether the state of the vehicle 10 is in a predetermined booming sound generating region. The booming sound generating region is determined by an experiment etc. by using the engine rotation speed Ne and the engine torque Te as parameters, as indicated by diagonal lines in FIG. 9, for example. The engine torque Te can be calculated from the throttle valve opening degree θth and the engine rotation speed Ne, for example. If the state of the vehicle 10 is not in the booming sound generating region, the process is simply terminated, and if the state of the vehicle 10 is in the booming sound generating region, step S2 is executed. The booming sound generating region is determined based on the torque variation characteristics shown in FIG. 7 etc. for each of the gear positions of the automatic transmission 22 in which the loaded portion 90 and the unloaded portion 92 are differently defined.

At step S2, the lubrication oil amount is increased by raising the line pressure PL. Specifically, as is apparent from the hydraulic control circuit 50 of FIG. 5, raising the line pressure PL of the line pressure oil passage 110 increases an excess hydraulic fluid other than the hydraulic fluid amount required for the engagement control of the friction engagement elements CB and the engagement control of the lock-up clutch 33, and the excess hydraulic fluid is supplied as the lubrication oil from the lubrication oil passage 136 to the friction engagement portions of the friction engagement elements CB. This leads to an increase in the lubrication oil amount for the released friction engagement element CB (the first clutch C1 of FIG. 6) between the unloaded portion 92 (the seventh rotating element rm7 of FIG. 6) rotated in a dragged manner and the member (the third rotating element rm3 of FIG. 6) rotated relatively to the unloaded portion 92 at lower rotation speed than the unloaded portion 92, so that the drag torque of the unloaded portion 92 is increased. Due to this drag torque, the unloaded portion 92 is rotated in a dragged manner while the backlash in the meshing portion between the third sun gear S3 of the unloaded portion 92 and the third planetary gear P3a of the loaded portion 90 is reduced by being pressed in a rotation load direction, and the inertia of the unloaded portion 92 is applied to the loaded portion 90 so that the inertia loss of the unloaded portion 92 is suppressed. Since the inertia of the unloaded portion 92 is added to the inertia of the loaded portion 90 in this way, the rotational vibration of the engine 12 is appropriately damped, and the occurrence of the booming sound is suppressed. A broken line of FIG. 7 shows the drive shaft torque variation when the lubrication oil amount is increased in the booming sound generating region (the region of NeA to NeB) and the booming sound is reduced.

Figure 9:
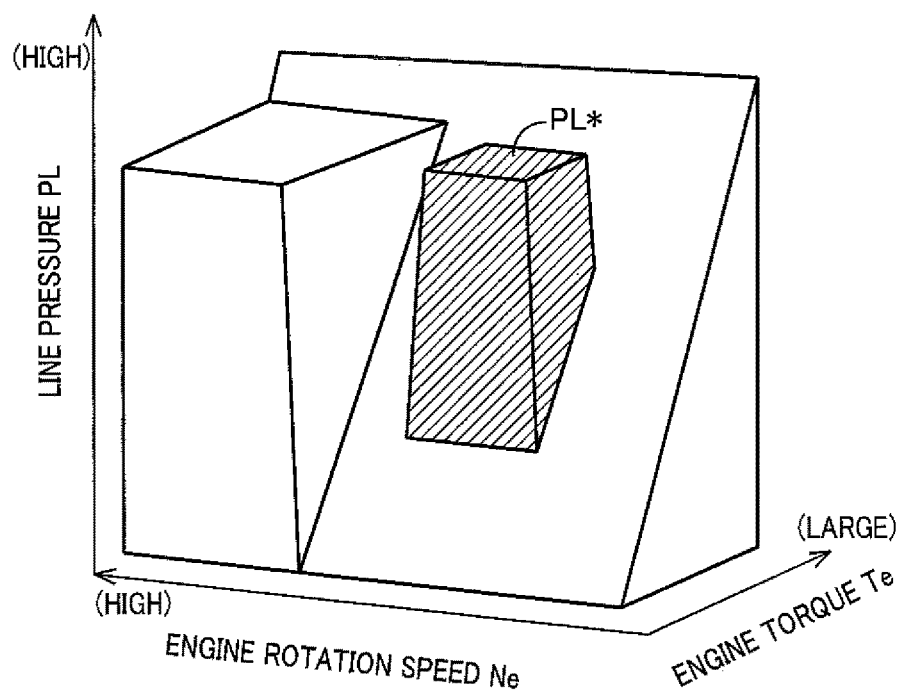
FIG. 9 is a diagram of an example of a map for explaining a booming sound generating region, in which the line pressure is increased.
Figure 10:
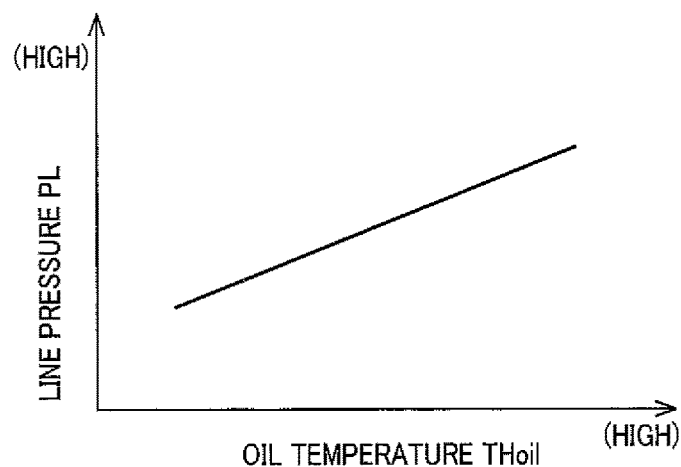
FIG. 10 is a diagram for explaining an example of a map when the line pressure in the booming sound generating region is increased as an oil temperature rises.

Regarding the raising of the line pressure PL at step S2, the line pressure PL may be raised to a predefined substantially constant increased line pressure value PL* as shown in FIG. 9, for example, or may be raised by a constant increment. The increased line pressure value PL* and the increment may variably be set by using the engine rotation speed Ne, the engine torque Te, etc. as parameters. Additionally, in this example, in consideration of a difference in viscosity of the lubrication oil, and thus a difference in drag torque, due to a difference in the oil temperature THoil of the lubrication oil, for example, as shown in FIG. 10, the oil temperature THoil is used as a parameter to make the line pressure PL higher and the increment of the lubrication oil amount larger when the oil temperature THoil is high as compared to when being low. Specifically, as shown in FIG. 10, the line pressure PL is continuously increased depending on the oil temperature THoil. As is apparent from FIG. 9, while the line pressure PL is basically increased in accordance with an increase in the engine torque Te and is set to a high line pressure when the engine rotation speed Ne is a predetermined value or more, the line pressure PL is increased in this example in the booming sound generating region (e.g., NeA to NeB of FIG. 7) while the rotation speed Ne is relatively low before achieving the high line pressure.

Returning to FIG. 8, at next step S3, the engagement (lock-up) of the lock-up clutch 33 is permitted. Specifically, when the lock-up clutch 33 is locked up, the rotational vibration of the engine 12 is directly transmitted from the torque converter 20 to the automatic transmission 22; however, since the rotational vibration is damped, and the occurrence of the booming sound is suppressed, by addition of the inertia of the unloaded portion 92 according to the increase in the lubrication oil amount, the lock-up of the lock-up clutch 33 is permitted. This lock-up permission causes the lock-up clutch control portion 76 to lock up the lock-up clutch 33. As a result, the lock-up region of the lock-up clutch 33 is expanded, and the fuel consumption is improved.

As described above, the control device (the electronic control device 70) of the vehicle 10 of this example raises the line pressure PL to increase the lubrication oil amount in the booming sound generating region (the portion with diagonal lines in FIG. 9) predefined with respect to the engine rotation speed Ne, so that the released friction engagement element CB is increased in rotational resistance. As a result, the unloaded portion 92 (the seventh rotating element rm7 of FIG. 6) rotated in a dragged manner is increased in the drag torque and is rotated in a dragged manner while the backlash in the meshing portion of the gear of the unloaded portion 92 with the gear of the loaded portion 90 (the third planetary gear P3a of FIG. 6 (see FIG. 2)) is reduced by being pressed in the rotation load direction, and the inertia of the unloaded portion 92 is applied to the loaded portion 90 so that the inertia loss of the unloaded portion 92 is suppressed. Since the inertia of the unloaded portion 92 is added to the inertia of the loaded portion 90 in this way, the rotational vibration of the engine 12 is appropriately damped, and the occurrence of the booming sound is suppressed.

Since the booming sound generating region is defined by using the engine rotation speed Ne and the engine torque Te as parameters, the booming sound generating region can appropriately be set, and the lubrication oil amount may be increased within a minimum necessary range, so that the fuel consumption is restrained from deteriorating due to the increase in the lubrication oil amount.

Since the line pressure PL is made higher to make the increment of the lubrication oil amount larger when the oil temperature THoil of the lubrication oil is high as compared to when being low, the drag torque attributable to the lubrication oil can appropriately be ensured even when the oil temperature THoil is raised and the viscosity of the lubrication oil is lowered. Additionally, since the drag torque becomes larger due to the increase in the lubrication oil amount during low oil temperature making the viscosity higher, the load of the engine 12 can be prevented from becoming excessively large and causing an engine stall etc. Therefore, a minimum necessary amount of the lubrication oil can be achieved according to the oil temperature THoil.

Since the lock-up of the lock-up clutch 33 is permitted after making the line pressure PL higher and increasing the lubrication oil amount, the fuel consumption can be improved by the lock-up of the lock-up clutch 33 with the occurrence of the booming sound suppressed by the increase in the lubrication oil amount. Specifically, when the lock-up clutch 33 is locked up, the rotational vibration of the engine 12 is directly transmitted to the power transmission system such as the automatic transmission 22, and the booming sound easily occurs; however, the occurrence of the booming sound is suppressed due to the increase in the lubrication oil amount, so that the lock-up region of the lock-up clutch 33 can be expanded to improve fuel consumption.

Since the unloaded portion 92 (the seventh rotating element rm7 of FIG. 6) which is rotated in a dragged manner in the power transmission state and the released friction engagement element CB (the first clutch C1 of FIG. 6) which is disposed between the unloaded portion 92 and the member (the third rotating element rm3 of FIG. 6) rotated relatively to the unloaded portion 92 are provided, and the amount of the lubrication oil which is also supplied to the released friction engagement element CB is increased, therefore, the drag torque of the unloaded portion 92 is reliably increased to function the unloaded portion 92 as a loaded portion, so that the occurrence of the booming sound can be suppressed.

Since the hydraulic actuator 120 of the released friction engagement element CB (the first clutch C1 of FIG. 6) is disposed in the unloaded portion 92 (the seventh rotating element rm7 of FIG. 6), and the unloaded portion 92 has the large inertia (mass), for example, in the rotation speed region in which the rotational vibration of the engine 12 is large so that the collision of the unloaded portion 92 with the gear (the third planetary gear P3a) of the loaded portion 90 is repeated, the unloaded portion 92 is rotated in a dragged manner while maintaining the meshing state with the gear of the loaded portion 90 (a pressing state in the rotation load direction) and functions as a loaded portion, so that the rotational vibration of the engine 12 can appropriately be damped to suppress the occurrence of the booming sound. On the other hand, when the engine rotation speed Ne rises and the rotational vibration decreases, the collision of the unloaded portion 92 with the gear (the third planetary gear P3a) of the loaded portion 90 is reduced or eliminated, resulting in the inertia loss of the unloaded portion 92, which makes it difficult to damp the rotational vibration of the engine 12, so that the booming sound possibly occurs due to the rotational vibration; however, since the lubrication oil amount is increased in the booming sound generating region, the increased drag torque suppresses the inertia loss of the unloaded portion 92 so that the occurrence of the booming sound is appropriately suppressed.

Although the engine 12 is used as the drive source and the booming sound tends to occur due to the rotational vibration resulting from the explosion of the engine 12, the lubrication oil amount is increased in the booming sound generating region, and therefore, the inertia of the unloaded portion 92 is applied to the loaded portion 90 due to the increase in the drag torque, so that the rotational vibration is appropriately damped to suppress the occurrence of the booming sound.

Since the region defined as the booming sound generating region is the engine rotation speed region in which the booming sound tends to occur since the explosion vibration of the engine 12 decreases as the engine rotation speed Ne increases, in other words, the engine rotation speed region in which the inertia loss of the unloaded portion 92 occurs, and the lubrication oil amount is increased in the engine rotation speed region, the lubrication oil amount is increased in the minimum necessary engine rotation speed region for the suppression of occurrence of the booming sound, and the fuel consumption is restrained from deteriorating due to the increase in the lubrication oil amount.

Since the automatic transmission 22 is included for selectively engaging the multiple hydraulic friction engagement elements CB to form the multiple gear positions different in transmission ratio γ, and the remainder of the hydraulic fluid used for engaging the friction engagement elements CB is supplied as the lubrication oil, the lubrication oil amount can be increased by increasing the hydraulic pressure of the hydraulic control circuit 50, i.e., the line pressure PL, and the occurrence of the booming sound can appropriately be suppressed by increasing the lubrication oil amount.

Although the examples of the present invention have been described in detail with reference to the drawings, these are merely an embodiment and the present invention can be implemented in variously modified and improved forms based on the knowledge of those skilled in the art.

REFERENCE SIGNS LIST

10: Vehicle 12: Engine (Drive source) 16: Power transmission device 20: Torque converter (Hydraulic power transmission portion) 22: Automatic transmission (Multi-speed transmission) 33: Lock-up clutch 50: Hydraulic control circuit (Lubricating device) 70: Electronic control device (Control device) 78: Lubrication control portion 90: Loaded portion (Loaded rotating element) 92: Unloaded portion (Unloaded rotating element) 120, 122, 124, 126, 128, 130: Hydraulic actuator 138: Lubrication site (Friction engagement portion) C1 to C4: Clutch (Hydraulic friction engagement device, Friction engagement element) B, B2: Brake (Hydraulic friction engagement device, Friction engagement element) rm2 to rm7: Rotating element S1, S2, S3: Sun gear (Gear) P1a, P1b, P2, P3a: Planetary gear (Gear) R1, RR: Ring gear (Gear) PL: Line pressure (Hydraulic pressure) THoil: Oil temperature (Temperature of hydraulic fluid)

What is claimed is:

1. A control device of a vehicle having
   a drive source,
   a power transmission device having a plurality of rotating elements and a plurality of friction engagement elements selectively coupling the plurality of rotating elements for transmitting an output of the drive source, and
   a lubricating device supplying a lubrication oil to the friction engagement elements for lubrication,
   the control device comprising:
   a lubrication control portion configured to increase an amount of the lubrication oil to the friction engagement elements from the lubricating device in a booming sound generating region predefined with respect to a drive source rotation speed.

2. The control device of a vehicle according to claim 1, wherein
   the booming sound generating region is determined by using the drive source rotation speed and a drive source torque as parameters.

3. The control device of a vehicle according to claim 1, wherein
   depending on an oil temperature of the lubrication oil, the lubrication control portion increases an increment of the lubrication oil amount when the oil temperature is high as compared to when the oil temperature is low.

4. The control device of a vehicle according to claim 1, wherein
the power transmission device includes a hydraulic power transmission portion including a lock-up clutch on an input side, and wherein
the lubrication control portion permits engagement of the lock-up clutch after increasing the lubrication oil amount.

5. The control device of a vehicle according to claim 1, wherein
the plurality of rotating elements of the power transmission device include an unloaded rotating element rotated in a dragged manner in a power transmission state and the plurality of friction engagement elements include a released friction engagement element disposed between a member of the plurality of rotating elements rotated relatively to the unloaded rotating element and the unloaded rotating element, and wherein
the lubrication control portion increases the lubrication oil amount for at least the released friction engagement element.

6. The control device of a vehicle according to claim 5, wherein
each of the plurality of friction engagement elements is a hydraulic friction engagement device frictionally engaged by a corresponding hydraulic actuator, and wherein
the unloaded rotating element is disposed with the hydraulic actuator of the released friction engagement element.

7. The control device of a vehicle according to claim 1, wherein
the drive source is an engine combusting fuel to generate power.

8. The control device of a vehicle according to claim 7, wherein
the booming sound generating region is an engine rotation speed region in which the booming sound more easily occurs since an explosion vibration of the engine decreases as an engine rotation speed increases.

9. The control device of a vehicle according to claim 1, wherein
the power transmission device includes a planetary gear type multi-speed transmission selectively engaging a plurality of hydraulic friction engagement devices serving as the friction engagement elements to form each of a plurality of gear positions different in transmission ratio, wherein
the vehicle includes a hydraulic control circuit supplying a hydraulic fluid to the plurality of hydraulic friction engagement devices for selective engagement, and wherein
the lubricating device comprises the hydraulic control circuit such that the hydraulic control circuit is configured to supply the remainder of the hydraulic fluid used for engaging the hydraulic friction engagement devices as a lubrication oil for lubricating a friction engagement portion of each of the hydraulic friction engagement devices, and wherein
the lubrication control portion increases a hydraulic pressure of the hydraulic control circuit.

* * * * *